United States Patent [19]

Tokuyama et al.

[11] Patent Number: 4,618,905

[45] Date of Patent: Oct. 21, 1986

[54] DC CIRCUIT BREAKER

[75] Inventors: Shunji Tokuyama, Hitachi; Koji Suzuki, Takahagi; Keiji Arimatsu, Hitachi, all of Japan

[73] Assignee: Hitachi, Ltd., Tokyo, Japan

[21] Appl. No.: 653,051

[22] Filed: Sep. 21, 1984

[30] Foreign Application Priority Data

Sep. 21, 1983 [JP] Japan ............................... 58-173039

[51] Int. Cl.[4] ............................................... H02H 7/00

[52] U.S. Cl. ........................................... 361/4; 361/5; 361/13

[58] Field of Search ................. 361/4, 5, 13; 307/134, 307/135

[56] References Cited

U.S. PATENT DOCUMENTS 4,550,356 10/1985 Takahashi ............................ 361/13
4,578,730 3/1986 Tokuyama et al. ..................... 361/4

FOREIGN PATENT DOCUMENTS 2039065 2/1972 Fed. Rep. of Germany ...... 307/135
394866 12/1973 U.S.S.R. ................................ 361/4

*Primary Examiner*—A. D. Pellinen
*Assistant Examiner*—Jeffrey A. Gaffin
*Attorney, Agent, or Firm*—Antonelli, Terry & Wands

[57] ABSTRACT

A line voltage charging type DC circuit breaker for use in DC transmission, having a series circuit connected in parallel with a commutation breaker, the series circuit being constituted by a capacitor to be charged by a line voltage, a reactor, and a circuit-closing means connected in series with each other, the DC circuit breaker comprising a circuit for charging the capacitor, the charging circuit including a current direction restricting circuit for restricting a current flowing through the restricting circuit only in one direction and a reverse control circuit for controlling the current direction restricting circuit to reverse the direction of a current for charging the capacitor in accordance with the power flow reversal control of the DC transmission.

11 Claims, 19 Drawing Figures

DC CIRCUIT BREAKER

The present invention relates to a line voltage charging type DC circuit breaker in a DC power transmission, and more particularly to a DC circuit breaker which is improved in its breaking function when the whole power flow of the DC power transmission is reversed by controlling converters.

There is no natural zero current point in a direct current unlike an alternating current and it is necessary to form a zero current point by any means as disclosed in Japanese Patent Application Laid-open Nos. 42379/1978 or 90830/1982. Generally, circuit breakers are briefly grouped into two types. In one type, a zero current point is formed by charging or discharging a capacitor, which is not charged at ordinary time, when the circuit breaker is broken. In the other type, an oscillating current is generated by discharging a capacitor, which is charged at ordinary time, when the circuit breaker is broken, thereby a zero current point is forcibly formed. The present invention belongs to the latter type, and paticularly relates to a line voltage charging type DC circuit breaker in which a charging device for charging a capacitor is contracted and the capacitor is charged by the line of the transmission system.

Prior art and the present invention will be described by referring to accompanying drawings in which:

FIG. 18 is a characteristic diagram showing the operation of the circuit of FIG. 17; and FIG. 19 is a schematic circuit diagram of an eighth embodiment of the DC circuit breaker according to the present invention.

Figure 1:
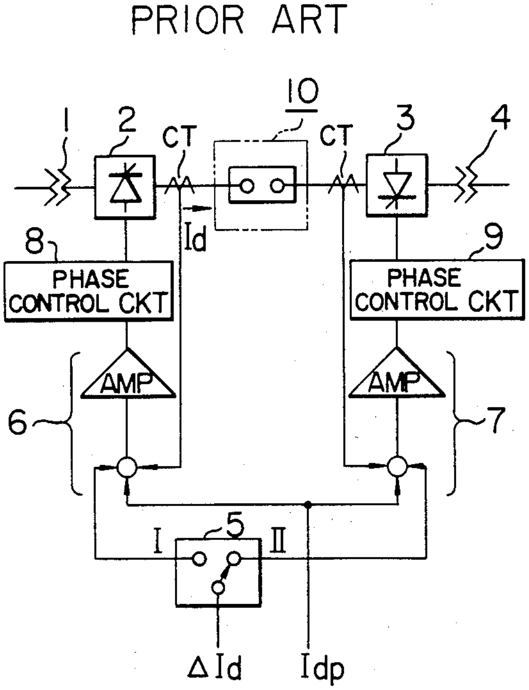
FIG. 1 PRIOR ART
FIG. 1 is a schematic circuit diagram of the conventional power flow reversal control means.
Figure 2:
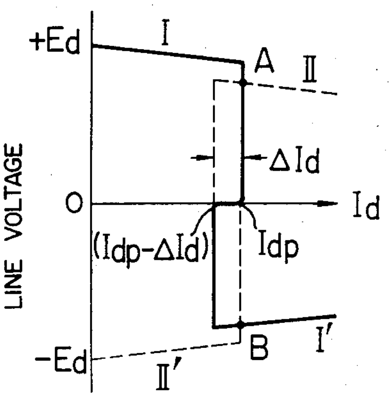
FIG. 2 PRIOR ART
FIG. 2 is a characteristic diagram showing the operation of the circuit of FIG. 1.

Referring to FIGS. 1 to 4, prior art will be described hereunder. FIG. 1 is a schematic circuit diagram showing a whole power flow reversal control system (hereinafter referred to as power flow reversal control) and FIG. 2 is an operation explanatory diagram. Generally, in a DC system, an AC power received from the AC side of the system through a transformer 1 is converted by a converter 2 into an DC power (the converter 2 may function in the reverse manner), thus obtained DC power is transmitted to another converter 3 through a line to be converted again into an AC power (the converter 3 may function in the reverse manner), and then converted AC power is supplied to the line through another transformer 4. Although the drawing shows an example of two-terminal power transmission, a DC circuit breaker 10 is provided in the line taking a case of multiterminal transmission into consideration. In the illustrated control system, the power flow reversal control is performed by changing the current margine ΔId. That is, the power can be reversed by switching a current margin change-over switch 5 selectively into the side-I or side-II under the condition that a DC current setting value Idp is applied to each of the converters 2 and 3. The converters 2 and 3 are provided with respective constant current control circuits 6 and 7 and respective phase control circuits 8 and 9. FIG. 2 shows an example of operation in which a line current Id, the DC current setting value Idp, and the current margin ΔId are compared to one another. Prior to the reverse (the line voltage has a positive polarity), the DC current setting Idp as shown in the operation characteristic I is applied to the side of the converter 2, while the current Idp−ΔId as shown in the operating characteristic II is applied to the side of the converter 3, so that the system is being operated at the operating point A which is an intersection point between the operation characteristics I and II. If desired, the power flow reversal control can be performed by switching the current margin change-over switch 5 into the I side. As apparent from the operation characteristic after reverse (line voltage is negative) in FIG. 2, the current Idp−ΔId as shown in the operation characteristics I′ is applied to the side of the converter 2, while the current Idp as shown in the operation characteristic II′ is applied to the side of the converter 3, so that the system is operated at the operation point B which is an intersection point between the operation characteristics I′ and II′. The power flow reversal control is performed by switching the current margin change-over switch 5.

Figure 3:
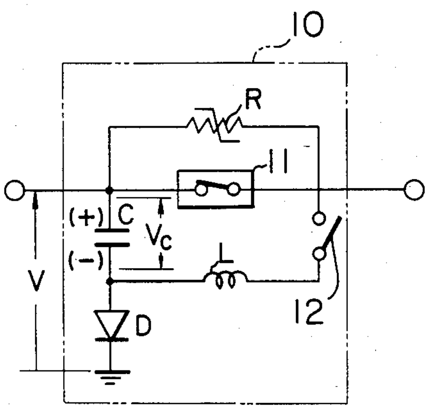
FIG. 3 PRIOR ART
FIG. 3 is a schematic circuit diagram of the conventional DC circuit breaker.
Figure 4:
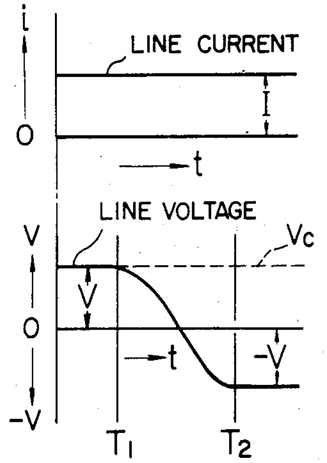
FIG. 4 PRIOR ART
FIG. 4 is a characteristic diagram showing the operation of the circuit of FIG. 3.

FIG. 3 shows an example of the conventional arrangement of the DC circuit breaker 10 as shown in FIG. 1. In the drawing, the DC breaker 10 is constituted by a commutation breaker 11 for performing on/off of the line current, a capacitor C charged by the line voltage through a diode D, a reactor L used as an auxiliary means for breaking a DC current, a closing switch 12, a nonlinear resistor R (for example, a resistor containing zinc oxide as a main component) for suppressing an overvoltage and absorbing energy after breaking operation and for finally performing current-limiting breaking. FIG. 4 shows an example of waveforms of the line current i and the line voltage v in the power flows reversal operation. The line current is constant and only the polarity of the line voltage is reversed between the time points $T_1$ to $T_2$. Generally, the duration of reverse is about 0.2 to 0.5 seconds.

In the DC circuit breaker as shown in FIG. 3, the voltage $v_c$ across the capacitor C in the power flow reversal control has a waveform as indicated by a broken line in FIG. 4. Even if a ground-fault occurs in the operation of the power flow reversal control, the capacitor C is prevented from being discharged by the diode D, so that the breaking the line current can be performed without hindrance in case of a ground-fault in the operation of the power flow reversal control.

After the completion of the power flow reversal operation, however, the polarity of the voltage of the capacitor C is different from that of the line voltage so that the diode D is left in the nonconducting state and it becomes impossible to charge the capacitor C by the line voltage. Accordingly, it has been found that there is a problem that the DC circuit breaker 10 loses the ability to break the line current. If this disadvantages is not eliminated, it is difficult to apply this method of charging a capacitor by a line voltage to a practical system.

An object of the present invention is to provide a reliable DC circuit breaker in which a line current can be broken without hindrance even after the reverse of the polarity of the line voltage.

According to the present invention, means for switching the polarity of a capacitor is provided in a capacitor charging circuit and the means is directly or indirectly controlled on the basis of a control signal of a converter. For example, thyristors connected in anti-parallel to each other are used and the firing angles of the thyristors are controlled by control signals of converters so as to switch one thyristor used before the power flow reversal operation to the other thyristor to be used after power flow reversal operation to thereby make it possible to reversely charge the capacitor.

Further, although thyristors or diodes are used as current direction restricting means in an embodiment of the present invention, any other means capable of restricting a direction of a current may be used.

The above and other objects, features and advantages of the present invention will be apparent from the following detailed description of preferred embodiments thereof taken in conjunction with the accompanying drawing.

Figure 5:
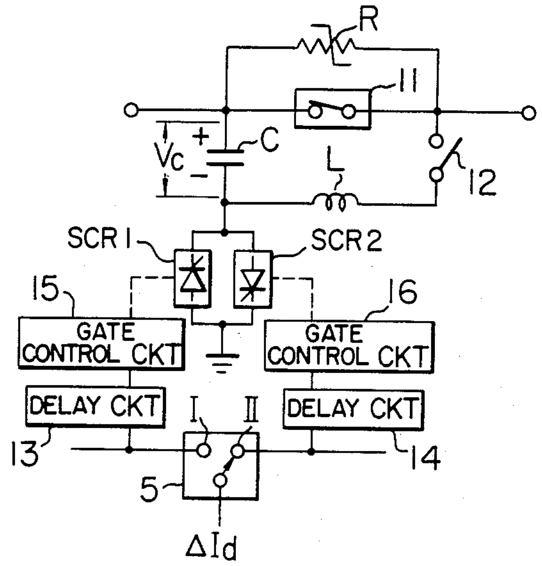
FIG. 5 is a schematic circuit diagram of a first embodiment of the DC circuit breaker according to the present invention.

Referring to FIG. 5, an embodiment of the present invention will be described hereunder. That having the same function as that in FIG. 3 are designated by the same reference numeral as used in FIG. 3. As a device for changing-over the polarity of charging a capacitor C, anti-parallelly connected thyristors SCR1 and SCR2 are connected between an end of the capacitor C and the earth (or a return line). Each of thyristors is controlled led by a current margin change-over switch 5, delay circuits 13 and 14, and gate control circuits 15 and 16. An example of the operation of this arrangement is shown in FIG. 6.

Figure 6:
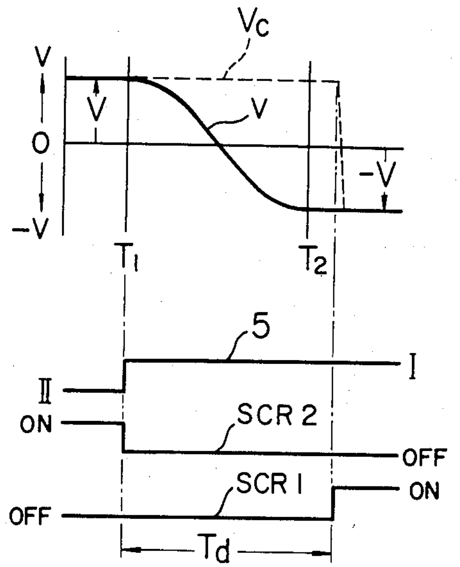
FIG. 6 is a characteristic diagram showing the operation of the circuit of FIG. 5.

When the power flow reversal control is effected by changing-over the current margin change-over switch 5 to the side-I from the state in which the switch 5 is connected to the side-II so that the current margin ΔId is applied to one converter and the thyristor SCR2 is being in its on-state, the thyristor SCR1 is turned off to separate the capacitor C from the earth with the terminal voltage Vc of the capacitor C as indicated by a broken line in FIG. 6. The voltage across the capacitor C is maintained at a value prior to changing-over so that the DC circuit breaker has an effect that it can effect a predetermined breaking performance with respect to the breaking operation in the operation of power flow reversal control.

A change-over signal to the side-I is delayed by Td by the delay circuit 13 and the thyristor SCR1 is turned on at a time point after the time T2 at which the power flow reversal control has been completed. Thus, the capacitor C is rapidly charged in the reverse polarity to a value equal to the line voltage. Thereafter, the terminal voltage of the capacitor C is maintained at this value, thus providing a reliable DC circuit breaker which shows a predetermined breaking performance.

As seen from the description made above, the thyristors SCR1 and SCR2 constitue a current direction restricting means for the capacitor C and the arrangement for controlling the firing of the thyristors constitutes a reverse controlling means for the capacitor C.

Figure 7:
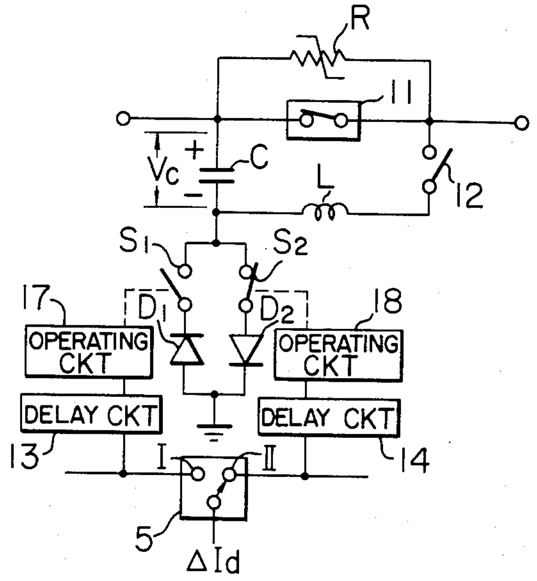
FIG. 7 is a schematic circuit diagram of a second embodiment of the DC circuit breaker according to the present invention.
Figure 8:
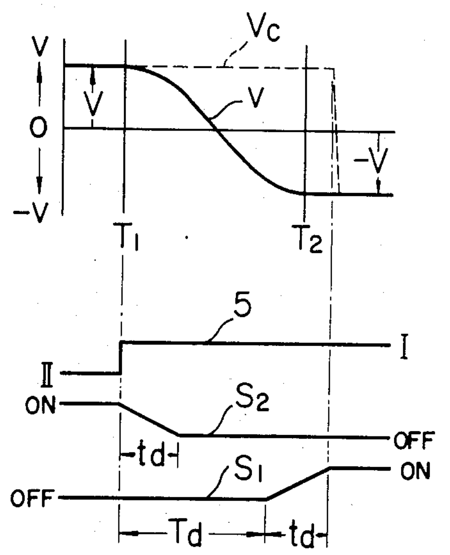
FIG. 8 is a characteristic diagram showing the operation of the circuit of FIG. 7.

In another embodiment shown in FIG. 7, diodes are employed as a current direction restricting means and switches connected in series with the respective diodes are used as a reverse control means. In FIG. 7, switches S1 and S2 are respectively connected in series with diodes D1 and D2 which are anti-parallelly connected with each other through the switches S1 and S2. Thus, the diodes D1 and D2 are different in polarity from each other. The on/off operation of the switches S1 and S2 is controlled respectively by operating circuits 17 and 18.

When the power flow reversal control is effected by changing-over a current margin change-over switch 5 to its side-I from the state in which the switch 5 is connected to its side-II and the switch S2 is in its on-state, a circuit opening instruction is given to the operating circuit 18 simultaneously with the change-over operation, so that the contacts of the switch S2 are opened with a delay of dead period of time $t_d$ of the operating circuit 18, while the voltage Vc across a capacitor C is maintained at a value before the power flow reversal operation.

A changing-over signal for the side-I is delayed by Td by a delay circuit 13 and applied to the operating circuit 17 as a closing instruction, so that the contacts of the switch 1 is closed after a delay of dead time $t_d$ of the operating circuit 17. This point of time is set to come after the point of time T2 at which the power flow reversal operation is completed. Upon turning-on the switch S1, the capacitor C is rapidly reversely charged through the diode D1 and thereafter the voltage across the capacitor C is maintained at a value equal to the line voltage after the power flow reversal operation.

Figure 9:
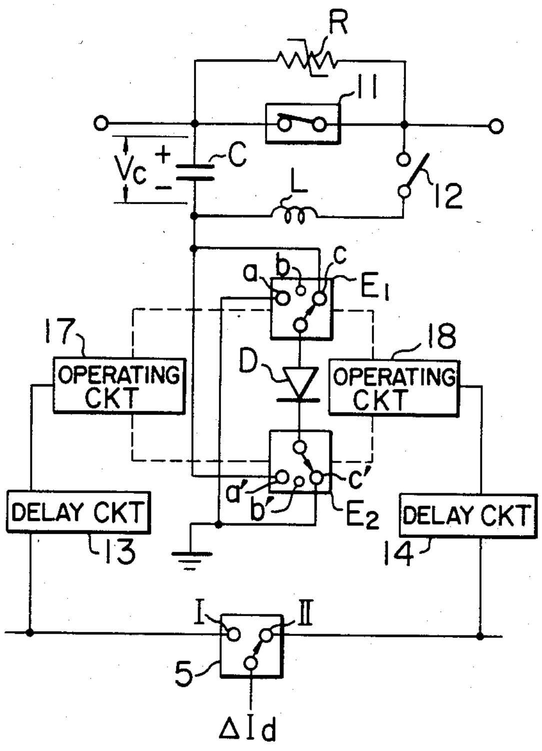
FIG. 9 is a schematic circuit diagram of a third embodiment of the DC circuit breaker according to the present invention.
Figure 10:
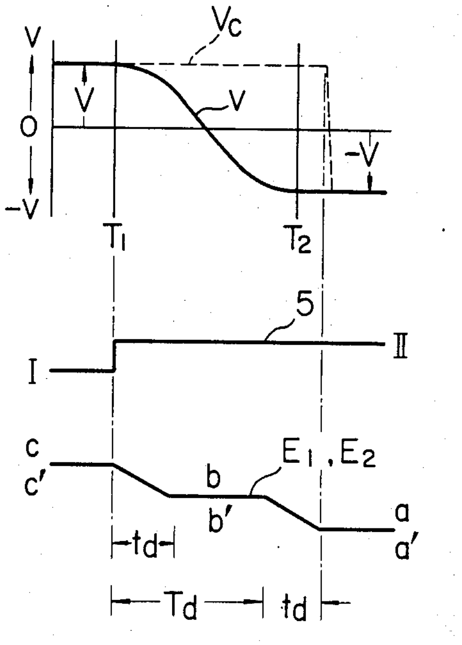
FIG. 10 is a characteristic diagram showing the operation of the circuit of FIG. 9.

FIG. 9 shows a further embodiment in which a single diode D is employed as a current direction restricting means, and change-over switches E1 and E2 used as a part of an reverse control means are respectively connected to the opposite ends of the diode D such that the direction of the diode D with respect to the capacitor is reversed by controlling the on/off state of these change-over switches E1 and E2.

When the power flow reversal control is effected by changing-over a current margin change-over switch 5 to its side-I from the state in which the switch 5 is connected to its side-II and the change-over switches E1 and E2 are respectively connected to the contacts c and c′, a circuit opening instruction is given to an operating circuit 18 simultaneously with the change-over operation, so that the contacts c and c' are opened with a delay of dead period of time $t_d$ of the operating circuit 18.

A changing-over signal for the side-I is delayed by Td by a delay circuit 13 and applied to an operating circuit 17 as a closing instruction. The change-over switches E1 and E2 are closed at the contacts a and a' respectively with a delay of dead time $t_d$ of the operating circuit 17. Thus, the polarity of the diode D is reversed and the capacitor C is rapidly reversely charged through the diode D and thereafter the voltage across the capacitor C is maintained at a value equal to the line voltage after the power flow reversal operation. This point of time is set to come after the point of time T2 at which the power flow reverasl operation is completed.

In the respective embodiments as described above, other circuit closing means such as a gap, etc., may be used in place of the closing switch 12, and although a polarity reversing signal of the line voltage produced by the current margin change-over switch 5 is used in the embodiments, other signals may be used. That is, for example, an output signal of a constant voltage control circuit of a converter may be used while being distinguished from the case of fault.

Further, a charging resistor may be provided in series or in parallel with a capacitor charging polarity change-over means provided between one end of a capacitor C and the earth (or return path).

Referring to FIGS. 11 to 19, other embodiments of the present invention will be described hereunder. The following embodiments are featured in that a capacitor C is connected to the line after the polarity of the capacitor is reversed in conjunction with the power flow reversal operation.

Figure 11:
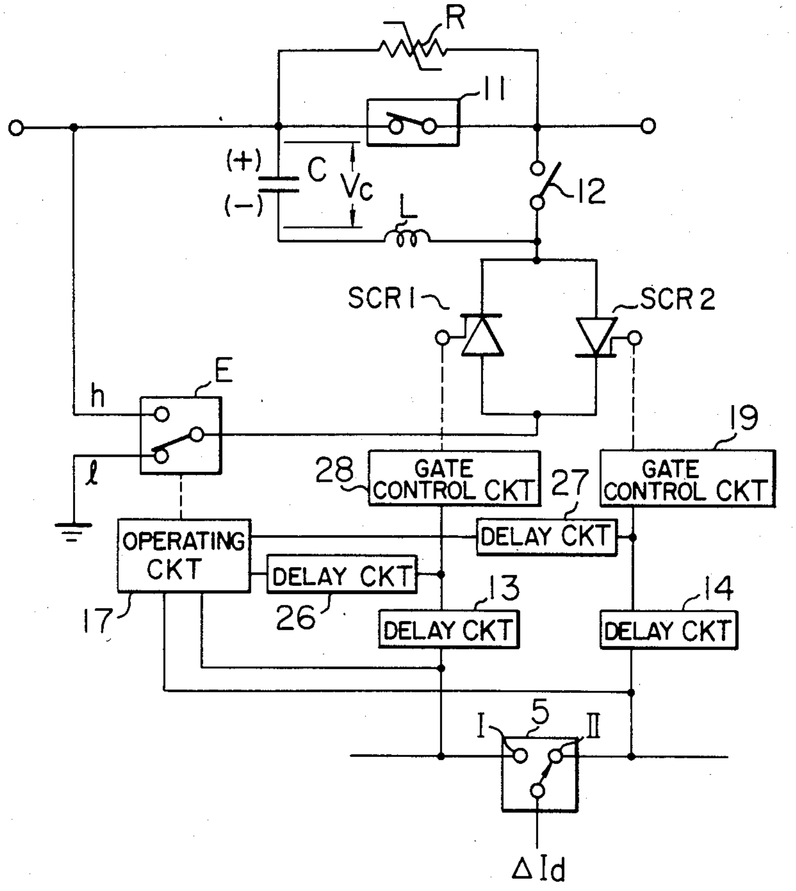
FIG. 11 is a schematic circuit diagram of a fourth embodiment of the DC circuit breaker according to the present invention.

In FIG. 11, that having the same function as that in FIG. 5 is designated with the same reference numeral. As means for changing-over the polarity of a capacitor C, there are provided a change-over switch E for changing-over the contact between a high-voltage side terminal h and an earth terminal l, and anti-parallelly connected thyristors SCR1 and SCR2 between the change-over switch E and an end of a reactor L. Further, as means for controlling the operation of the change-over switch E and the anti-parallelly connected thyristors SCR1 and SCR2, there are provided delay circuits 13, 14, 26, 27, an operating circuit 17 for operating the change-over switch E, gate controlling circuits 28 and 19 for the anti-parallelly connected thyristors SCR1 and SCR2, at the respective sides I and II of the current margine change-over switch 5.

Assume now that the left-side and right-side converters are operating as a rectifier and an inverter respectively, while these converters are not shown in the drawing. In this case, a cummutation breaker 11 is in its closed state and a circuit closing means 12 is in its opened state under the normal operating condition. The anti-parallelly connected thyristors are in the state such that the current margin change-over switch 5 is connected to the side-II so that the thyristor SCR2 is in its on-state. The change-over switch E is connected to the earth terminal l side. In the drawing, the marks (+) and (−) represent the polarity of the capacitor C which is charged by the line voltage.

Figure 12:
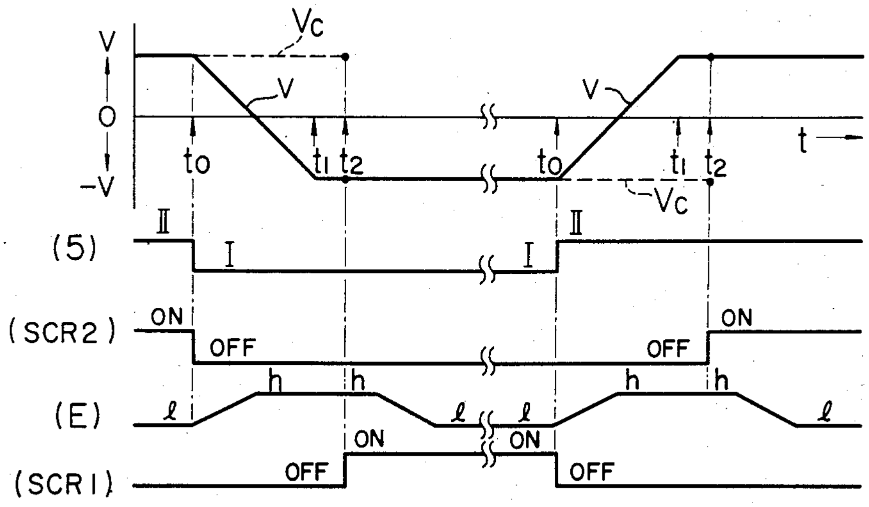
FIG. 12 is a characteristic diagram showing the operation of the circuit of FIG. 11.

FIG. 12 shows the changes in the line voltage and the terminal voltage of the capacitor C in power flow reversal control and the operation sequence. Referring to FIGS. 11 and 12, the operation in the power flow reversal control will be described. First, the current margin change-over switch 5 is changed-over to the side-I from the side-II in response to a power flow reversal instruction (at time $t_0$). At the same time that the change-over switch 5 is changed over to the side-I, the gate signal for the thyristor SCR2 disappears so that the thyristor SCR2 is turned off so as to cut off the earth side to thereby maintain the charged voltage with the polarity prior to the power flow reversal control. At the same time that change-over switch 5 is changed over to the side-I, a change-over signal instructing the change-over from the l side to the h side is given to the operating circuit 17 for the change-over switch E and the change-over switch E is connected to the h side with a delay of dead time of the operating circuit 17. At this time, both the thyristors SCR1 and SCR2 are in their off-state and the change-over switch E performs mechanical changing-over of connection. Electrical closing duty is not always required in this case.

The thyristor SCR1 is turned on at a point of time $t_2$ after the time $t_1$ at which the polarity is reversed after the power flow reversal operation has been completed. A change-over signal instructing the change-over of the current margin change-over switch 5 to the side-I is delayed by the delay circuit 13 and applied to the thyristor SCR1 through the gate control circuit 28 to turn-on the thyristor SCR1.

When the thyristor SCR1 is turned on, a circuit from the capacitor C to the same is closed through the reactor L, the thyristor SCR1, and the h side of the change-over switch E so that an L-C resonance current flows in this circuit. However, only the first half-wave of this L-C resonance current is allowed to flow at every cycle thereof because of the existence of the thyristor SCR1. Accordingly, the polarity of the capacitor C is reversed rapidly (at the time $t_2$). Thereafter, the output signal of the delay circuit 13 is further delayed by the delay circuit 26 and applied to the operating circuit 17 as a signal instructing the change-over of the movable contact of the change-over switch E from the contact h to the contact l. The contact l is closed with a delay of dead time of the operating circuit 17 for the change-over switch E. Thus, the capacitor C having its terminal voltage with same polarity as the line voltage is connected between the line and the earth to make the operation condition normal.

At the right half in FIG. 12, shown are the changes in the line voltage and the terminal voltage of the capacitor C when the power flow reversal control is effected again and the operation sequence of the current margin change-over switch 5, the thyristor SCR2, the change-over switch E, and the thyristor SCR1. In this case, the current margin change-over switch 5 is changed over to the side-II to turn-off the thyristor SCR1 and the change-over switch E is changed over to close the contact h. On the other hand, the delay circuit 14 and the gate control circuit 19 operate to turn-on the thyristor SCR2 so that the polarity of the capacitor C is rapidly reversed. Then, the change-over switch E is connected to the terminal l to put the operating state normal.

According to this embodiment, after the power flow reversal operation was effected, the capacitor is connected to the line under the condition that the polarity of the capacitor which has been charged prior to the power flow reversal operation is rapidly reversed by the reverse control means so as to coincide with the polarity of the line voltage, whereby the capacitor can be charged without hindrance even after the power flow reversal operation and a highly reliable DC breaker of the line charging type can be provided. Further, since a discharge circuit is formed in order to rapidly reversely charging the capacitor and the energy of the capacitor per se is utilized, the breaking operation is not affected by the line at this time. This embodiment is superior to the embodiments of FIGS. 5 to 10.

Figure 13:
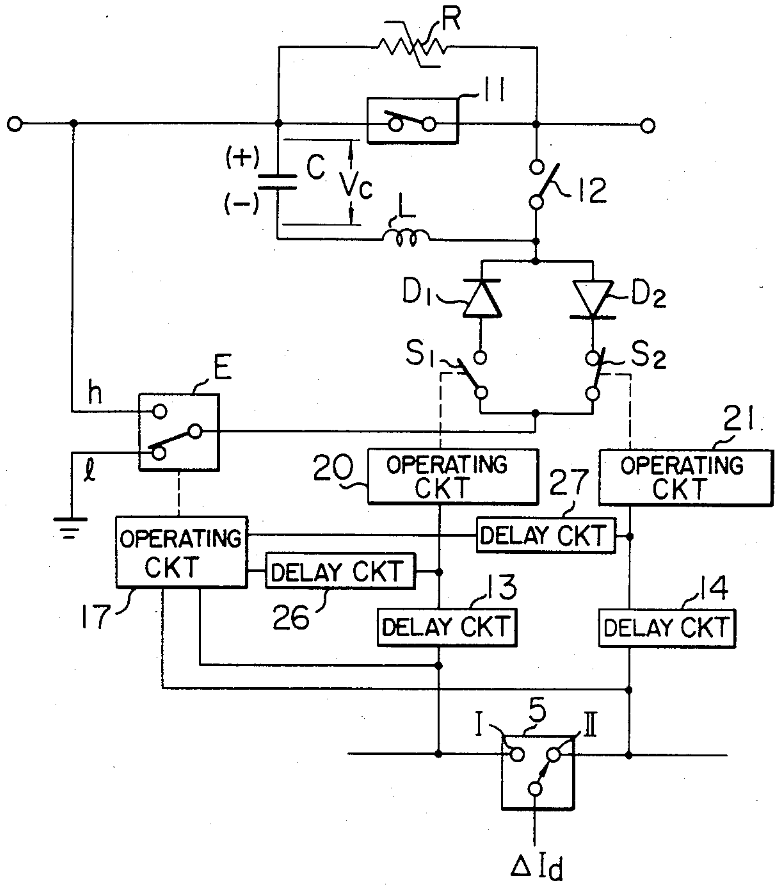
FIG. 13 is a schematic circuit diagram of a fifth embodiment of the DC circuit breaker according to the present invention.
Figure 14:
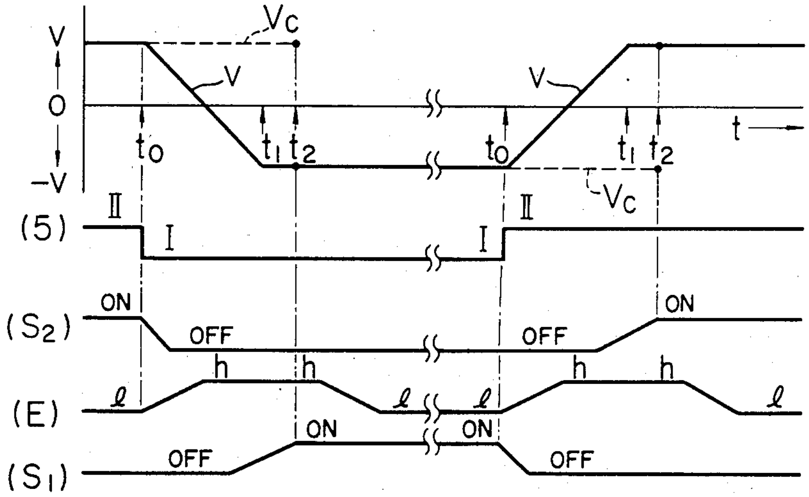
FIG. 14 is a characteristic diagram showing the operation of the circuit of FIG. 13.

FIG. 13 shows a further embodiment and FIG. 14 shows the operation sequence thereof. This embodiment is different from the embodiment of FIG. 11 in the point that the former has an economical arrangement in which the anti-parallelly connected thyristors SCR1 and SCR2 of FIG. 11 are respectively replaced by a series circuit of a diode D1 and a switch S1 and another serjes circuit of a diode D2 and a switch S2. Operating circuits 20 and 21 are provided for the switches S1 and S2 respectively. The remainder part of arrangement is quite the same as FIG. 11.

In the normal operation state, the switch S2 is in its closed state, the diode D2 is in its on-state, and a capacitor C is charged with the polarity as shown in the drawing. FIG. 14 shows the changes in the line voltage and the terminal voltage of the capacitor C in the power flow reversal control and the operation sequence. FIG. 14 is substantially the same as FIG. 2 except that there is an operation delay due to the dead time of each of the operating circuits 20 and 21 for the respective switches S1 and S2.

According to this embodiment, expensive thyristors can be replaced by inexpensive diodes and switches.

Figure 15:
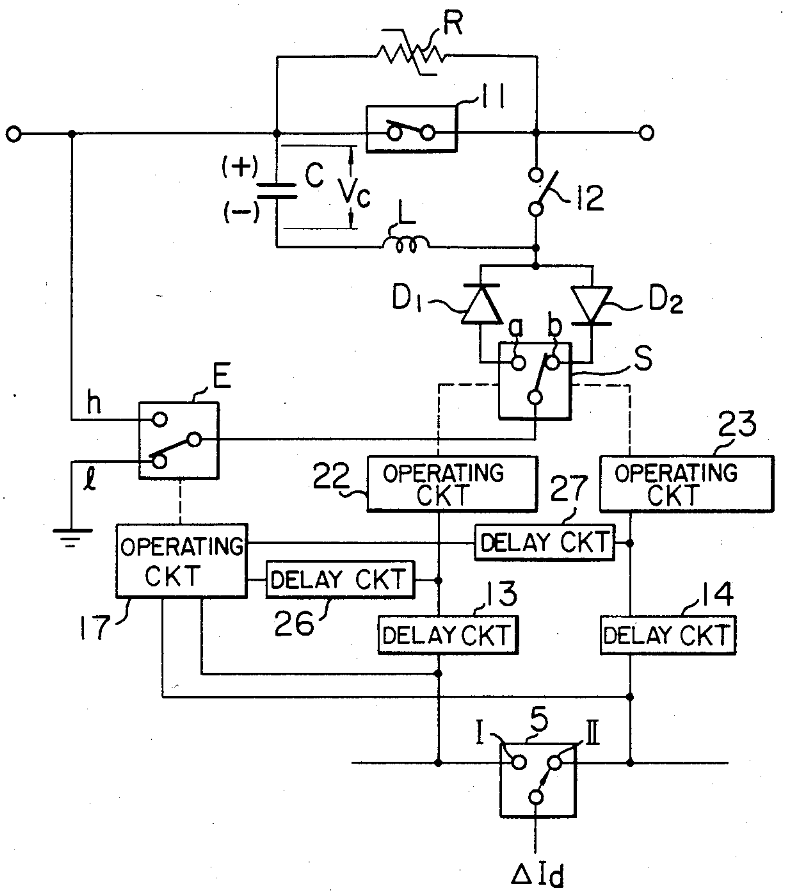
FIG. 15 is a schematic circuit diagram of a sixth embodiment of the DC circuit breaker according to the present invention.
Figure 16:
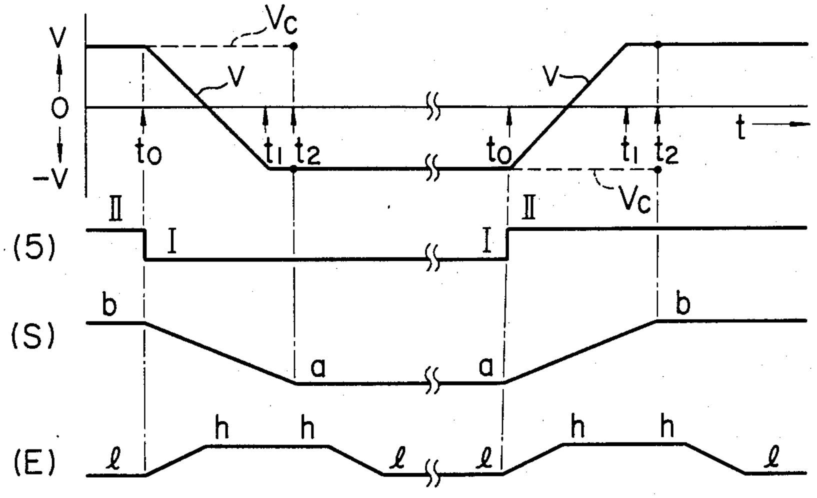
FIG. 16 is a characteristic diagram showing the operation of the circuit of FIG. 15.

FIG. 15 shows a still further embodiment and FIG. 16 shows an example of the operation thereof. This embodiment is different from the embodiment of FIG. 13 in the point that the switches S1 and S2 are replaced by a single diode change-over switch S which is operated by operating circuits 22 and 23. In FIG. 15, the same parts as that in FIG. 13 is designated by the same reference numeral as that used in FIG. 13. The operating sequence of this embodiment is different from that of FIG. 14 in that there is an operation delay because of the dead time of the operating circuits 22 and 23 for the change-over switch S.

According to this embodiment, the switches can be reduced in number to make the arrangement of the reverse control means be economical and simple.

Figure 17:
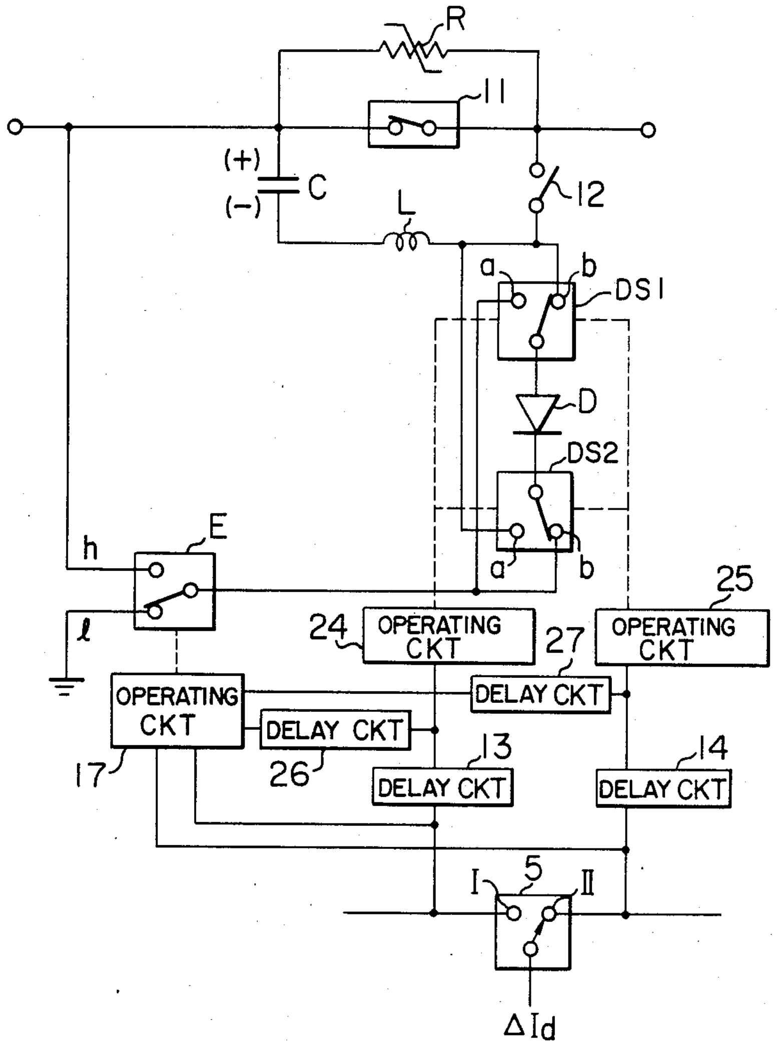
FIG. 17 is a schematic circuit diagram of a seventh embodiment of the DC circuit breaker according to the present invention.

FIG. 17 shows another embodiment and FIG. 18 shows the operation sequence thereof. This embodiment is different from the embodiment of FIG. 15 in that the diodes D1 and D2 in FIG. 15 are replaced by a single diode D and diode polarity change-over switches DS1 and DS2 are respectively provided at the opposite ends of the single diode D, the change-over switches DS1 and DS2 being arranged to be operated by common operating circuits 24 and 25. The operation sequence is quite the same as FIG. 16.

The switches DS1 and DS2 are operated by the operating circuits 24 and 25 such that each of them selectively takes one of the three positions, that is a-a, b-b or a neutral one. This embodiment is similar to the embodiment shown in FIG. 15 in arrangement of the reverse control means, and it is possible to make the arrangement in the former be quite the same as the embodiment shown in FIG. 15. In these two embodiments, the word "a diode" means an arrangement represented by an electrically equivalent circuit when the direction thereof, but not the number of connected elements thereof, is taken into consideration. Accordingly, the diode D may include not only a plurality of serially connected diodes but also a supporting arrangement thereof and, if necessary, a voltage equalizing means. The consideration as to such a specific arrangement applies to any one of the previous embodiments.

FIG. 19 shows a still further embodiment. Unlike the respective embodiments described above in which the reactor L of the DC circuit breaker is utilized to restrict the charge/discharge current of the capacitor C, a charge/discharge current restricting means such as a reactor L1 and/or a resistor R1 is provided in series with the polarity change-over means in this embodiment of FIG. 19 to attain the same purpose as the previous embodiments. A resistor R2 of a high resistance may be provided in parallel with the polarity change-over means.

Although a signal of the current margin change-over switch 5 is used as an operation control signal source for the polarity change-over means in each of the embodiments of FIGS. 11 to 19, the present invention is not limited to this and a signal of a converter controlling circuit can be utilized directly or indirectly. Further, although the delay circuits, the gate control circuits, the operating circuits, etc. are used in combination to control the polarity change-over means, it is of course possible to provide various modifications therefor. Although, a mechanical switch is used as the change-over switch E for the polarity change-over means in the previous embodiments, the present invention is not restricted to this. The circuit arrangement of the line charging type DC circuit breaker is shown merely by way of example and various modifications may be applied thereto. Further, although the change-over switch E is shown by way of example as a switch means provided for connecting the capacitor current direction control means SCR and D at its one end opposite to the other end to which the capacitor is connected, with selected one of the line and the earth, individual switch means may be separately provided for the opening/-closing control between the current direction restricting means and the earth and for the opening/closing control between the current direction restricting means and the line.

According to the present invention, the capacitor can be charged from the line even after the power flow reversal control and the present invention has an effect to provide a highly reliable line charging type DC circuit breaker.

According to the present invention, further, a closed circuit is formed for reversing the charging polarity of the capacitor and arranged such that the capacitor is reversely charged by using the energy of the previously charged capacitor, whereby not only the polarity reverse can be attained at a very high speed but also the charging in the reverse polarity can be effected without being affected by the line.

We claim:

1. A line voltage charging type DC circuit breaker for use in DC transmission system, having a series circuit connected in parallel with a commutation breaker, said series circuit being constituted by a capacitor to be charged by a line voltage, a reactor, and a circuitclosing means connected in series with each other, said DC circuit breaker comprising:

a charging circuit for charging said capacitor, said charging circuit including current direction restricting means for restricting a current flowing through said restricting means only in one direction and a reverse control means for controlling said current direction restricting means to reverse the direction of a current for charging said capacitor in accordance with a power flow reversal control of said DC transmission system.

2. A line voltage charging type DC circuit breaker for use in DC transmission system according to claim 1, in which said current direction restricting means includes anti-parallel connected thyristors.

3. A line voltage charging type DC circuit breaker for use in DC transmission system according to claim 2, in which said reverse control means includes a power flow change-over switch for producing a signal for reversing a power flow of said DC transmission, a first delay circuit for receiving the power flow reversing signal from said power flow change-over switch and for delaying the received power flow reversing signal by a predetermined time, and a gate control circuit for receiving the delayed signal from said first delay circuit for controlling gates of said thyristors, said capacitor being charged in the reverse direction after completion of the power flow reversal control of said DC transmission system.

4. A line voltage charging type DC circuit breaker for use in DC transmission system according to claim 3, in which said reverse control means further includes: a selection switch for selecting one of two connections, one being a closed circuit connection composed of said capacitor, said reactor, and said thyristors, and the other being a connection for connecting said capacitor, said reactor, and said thyristors to an earth; an operating circuit for receiving a signal from said power flow change-over switch and for operating said selection switch; and a second delay means connected between said first delay means and said operating means.

5. A line voltage charging type DC circuit breaker for use in DC transmission system according to claim 4, in which said reverse control means further includes means for restricting charge and discharge of said capacitor, said charge/discharge restricting means being connected between said thyristors and the junction between said capacitor and said reactor.

6. A line voltage charging type DC circuit breaker for use in DC transmission system according to claim 1, in which said current direction restricting means includes anti-parallel connected diodes and said reverse control means includes at least one switch connected to said diodes.

7. A line voltage charging type DC circuit, breaker for use in DC transmission system according to claim 6, in which said reverse control means further includes a power flow change-over switch for producing a signal for reversing a power flow of said DC transmission, a first delay circuit for receiving the power flow reversing signal from said power flow change-over switch and for delaying the received power flow reversing signal by a predetermined time, and a first operating circuit for receiving the delayed signal from said first delay circuit and for operating said switch connected to said diodes, said capacitor being charged in the reverse direction after completion of the reverse control of the power flow of said DC transmission system.

8. A line voltage charging type DC circuit breaker for use in DC transmission system according to claim 1, in which said current direction restricting means includes a diode and said reverse control means includes change-over switches provided at the opposite ends of said diode so that said change-over switches reverses the direction of connection of said diode in said charging circuit in accordance with the power flow reversal control of said DC transmission system.

9. A line voltage charging type DC circuit breaker for use in DC transmission system according to claim 8, in which said reverse control means further includes a power flow change-over switch for producing a signal for reversing a power flow of said DC transmission, a first delay circuit for receiving the power flow reversing signal from said power flow change-over switch and for delaying the received power flow reversing signal by a predetermined time, and a first operating circuit for receiving the delayed signal from said first delay circuit and for operating said switch connected to said diode, said capacitor being charged in the reverse direction after completion of the reverse control of the power flow of said DC transmission system.

10. A line voltage charging type DC circuit breaker for use in DC transmission system according to claim 9, in which said reverse control means further includes: a selection switch for selecting one of two connections, one being a closed circuit connection composed of said capacitor, said reactor, and said diode, and the other being a connection for connecting said capacitor, said reactor, and said diode to an earth; a second operating circuit for receiving a signal from said power flow change-over switch and for operating said selection switch; and a second delay means connected between said first delay means and said second operating means.

11. A line voltage charging type DC circuit breaker for use in DC transmission system according to claim 1, in which said reverse control means further includes: a selection switch for selecting one of two connections, one being a closed circuit connection composed of said capacitor, said reactor, and anti-parallel connected diodes, and the other being a connection for connecting said capacitor, said reactor, and said anti-parallel connected diodes to an earth; a second operating circuit for receiving a signal from said power flow change-over switch and for operating said selection switch; and a second delay means connected between said first delay means and said second operating means.

* * * * *